July 29, 1952
L. F. BARCUS
2,604,832
REFLEX CAMERA OPTICAL SYSTEM, INCLUDING
TELEPHOTO LENS AND TELESCOPE FINDER
Filed June 9, 1948
2 SHEETS—SHEET 1
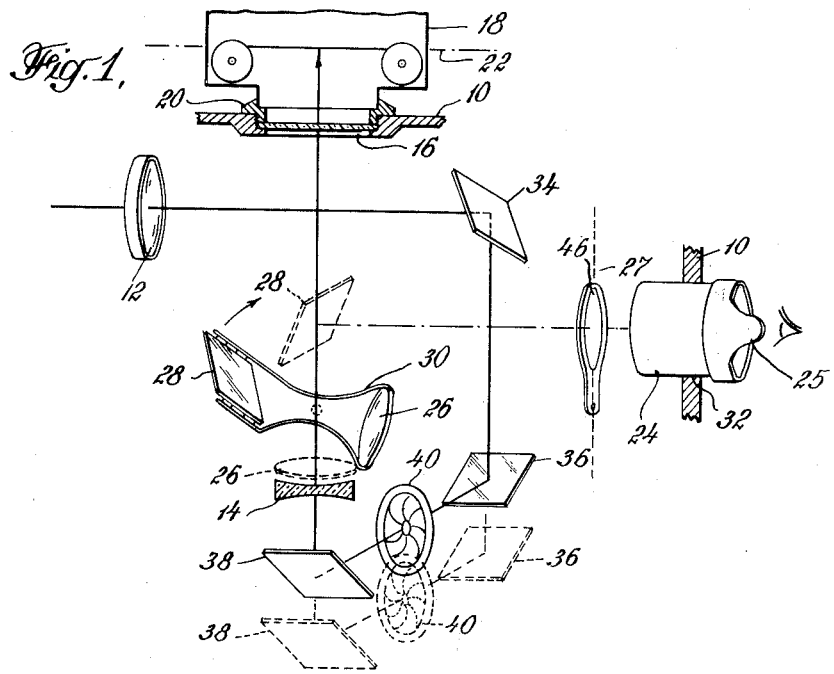
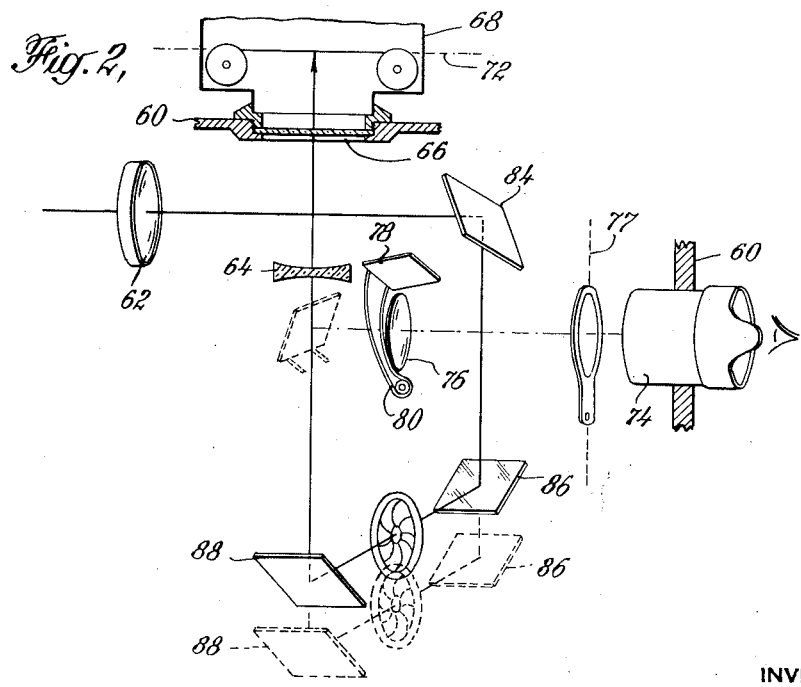
INVENTOR
LEONARD F. BARCUS
BY Pennie, Edmonds,
Morton and Barrows
ATTORNEYS July 29, 1952
L. F. BARCUS
2,604,832
REFLEX CAMERA OPTICAL SYSTEM, INCLUDING
TELEPHOTO LENS AND TELESCOPE FINDER
Filed June 9, 1948
2 SHEETS—SHEET 2
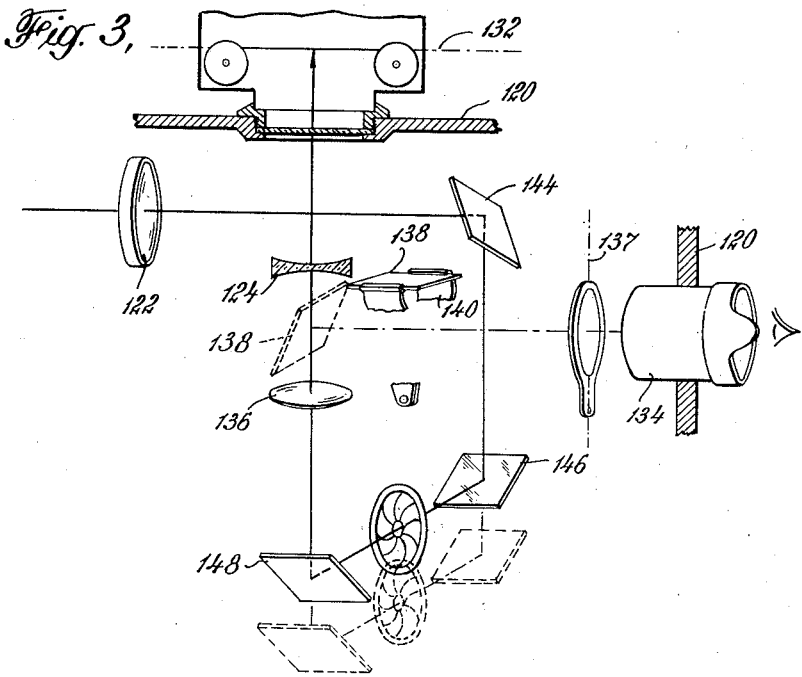
INVENTOR
LEONARD F. BARCUS
BY Pennie, Edmonds,
Morton and Barrows
ATTORNEYS Patented July 29, 1952

2,604,832

UNITED STATES PATENT OFFICE 2,604,832

REFLEX CAMERA OPTICAL SYSTEM, INCLUDING TELEPHOTO LENS AND TELESCOPE FINDER

Leonard F. Barcus, Yonkers, N. Y., assignor to Farrand Optical Co., Inc., a corporation of New York Application June 9, 1948, Serial No. 31,898

9 Claims. (Cl. 95—42)

1

This invention relates to optical instruments and more especially to an image-forming instrument adapted to visual and to photographic use. The present application is a continuation in part of my copending application, Serial No. 722,309, filed January 16, 1947, now Patent No. 2,536,866, issued January 2, 1951.

According to my invention I combine in a single instrument the elements necessary to provide a telescope, a telephoto lens and a telescopic view finder. In each of its three uses the instrument relies upon a separate combination of optical elements, reflecting, refracting and (in one use) scattering, but at least one refracting element is common to all three uses. By taking advantage of the fact that telescopes, telephoto lenses and telescopic view finders all require a convergent lens as one of their components, I have devised an instrument which performs visually as a telescope and as a view finder and photographically as a telephoto lens, employing in all cases the same convergent lens as the primary image-forming component closest to the object.

In my copending application above referred to, an instrument is described having these properties. In the instrument there described a single focusing adjustment varies the length of an optical path which is common to the photographic objective, to the telescope and to the telescopic view finder with which the photographic objective is combined. A switching mechanism optically connects the front lens component and the common optical path which is associated therewith alternately with an eyepiece belonging to the telescope and view finder and with the other components of the telephoto lens and camera.

I have found however that an instrument performing visually as a telescope and view finder and photographically as a telephoto lens may be produced in a variety of ways not all described in my copending application. Moreover, in the instrument there described two of the lens components, one belonging to the photographic objective and the other to the visual system, are movably mounted within the housing on a switching mechanism so that the photographic component undergoes rapid motion just prior to use. For quick transformation of the instrument from visual to photographic use, as is desirable if photography of transient subjects is to be made, these components must be accelerated from rest to a high velocity and back to rest again into a position of optical alignment with other elements, all in a very short space of time.

According to the present invention instead the

2 instrument is transformed from visual to photographic use by removing reflecting or refracting components or both from the optical path belonging to the photographic objective.

Broadly stated my invention comprises the provision of an instrument adapted to visual and to photographic use in which a common front or primary image-forming lens may be alternately connected optically with either of two rear or secondary image-forming lens components or systems. One of the rear lens systems adapts the instrument to photographic use by further refracting the rays which have passed through the front lens so as to bring them to focus in a final image plane fixed with reference to the instrument at which a photographic film or plate may be located. The other rear lens system adapts the instrument to visual use by bringing the image produced by the front lens component to focus at a second plane which is also fixed with reference to the instrument. The image produced at this plane may be examined by means of an eyepiece forming a part of this visual secondary image-forming lens system.

The image-forming rays which emerge from the eyepiece when the instrument is used visually may form the final visual image at infinity or at a finite distance from the instrument, depending upon the adjustment of the eyepiece with respect to the second image plane above referred to which is preferred by the observer. In either case the final visual image plane is also fixed with reference to the instrument.

Separate optical paths are associated with each of the secondary lens systems and switching means are provided to connect these rear optical paths with a front optical path which is associated with the front lens and which is common to all uses of the instrument. The instrument is provided with variable focus by means of movable mirrors or reflectors which permit variation in the length of a folded portion of the common front optical path.

When the switching means optically connects the photographic secondary lens system with the front lens the instrument may function as a telephoto lens for an associated photographic camera, which is removably mounted on the instrument so as to bring its film or plate into the photographic final image plane. When the switching means optically connects the visual secondary lens system with the front lens the instrument may function as a telescope, or as a telescopic view finder for the camera.

The two rear or secondary image-forming lens systems are so designed that each will have, when operating with the front lens, the same plane in the object space as a conjugate to its final image plane as has the other. This alternate conjugate relationship holds regardless of the length of the variable portion of the common optical path associated with the front lens. The variable portion lies between the front lens and the point at which the separate optical paths associated with the two secondary lens systems join with the common optical path. Thus, at the junction point between the common optical path associated with the front lens and the paths which are peculiar to the two secondary lens systems, the mean radius of curvature of the wave fronts associated with paraxial rays which will be brought to focus by one secondary lens system in its final image plane is the same as that of the wave fronts of paraxial rays which will be brought to focus by the other rear lens system in its final image plane.

In order to achieve this the two rear or secondary image-forming lens systems are so computed with reference to their distances from their respective final image planes and to the length of the optical paths which are peculiar to them that at the junction point the radius of curvature of the wave fronts of rays traced back from the axial point, say, in one final image plane is the same as the radius of curvature of the wave fronts of rays traced back from the axial point in the other final image plane.

This means that rays from any point or points in the object space which after refraction in the front lens and propagation down the common portion of the optical path arrive at the junction point with this radius of curvature for their associated wave fronts will be brought to focus alternately in both of the final image planes, according to the setting of the switching means. The combination of the front lens with one of the secondary lens systems will then always have the same focus as the combination of the front lens with the other secondary lens system. Therefore focusing of the telescope on a chosen object focuses the telephoto lens on the same object. The operation of focusing consists in varying the length of the variable portion of the common path until the rays originating at the desired object arrive at the junction point with the desired radius of curvature for their associated wave fronts, so that the image of the desired object will appear in focus in the final image planes.

I will now describe my invention in detail by a reference to a number of embodiments illustrated in the accompanying drawings.

In the accompanying figures:

Fig. 1 is a schematic view of the optical components of an instrument embodying the principles of my invention in a preferred form;

Fig. 2 is a schematic view of the optical components of an alternative embodiment of my invention; and Fig. 3 is a schematic view of the optical components of a further modification of my invention.

Having reference now to Fig. 1, an instrument embodying my invention includes a housing or framework 10 which supports in controllable geometric relation the optical elements which coact to provide the multi-purpose instrument which my invention furnishes. A housing similar in function is provided in the alternative embodiments of Figs. 2 and 3, where it is identified by the reference numbers 60 and 120, respectively.

The housing 10 provides support to a primary image-forming lens 12 which is common to the visual and to the photographic systems comprised within the instrument. The lens 12, which forms a component of the telephoto lens, of the telescope, and of the telescopic view finder, has a positive focal length. It may of course be made up of a number of elements.

The housing further supports two secondary image-forming lenses or lens systems, one of which coacts with the lens 12 to provide an instrument adapted to photographic use and one of which coacts therewith to provide an instrument adapted to visual use.

The photographic secondary lens system comprises, in the embodiment of Fig. 1, a lens 14 fixedly mounted within the housing 10 in coaxial relation with an aperture 16 in the housing. The aperture 16 is adapted to admit light from the interior of the housing into an associated photographic camera 18 which fits over the aperture 16 and from which the standard objective has been removed. The camera 18 does not form a part of the instrument of my invention. A mounting ring 20 of suitable form surrounds the aperture 16 and provides for a light-tight fit between the lens barrel of the camera and the housing 10.

The lens 14 is mounted in the housing with its axis perpendicular to that of the front lens 12 and the two are rendered optically coaxial over a folded path by means of three mirrors 34, 36 and 38. The optical path which joins the lenses 12 and 14 is substantially longer than their geometrical separation, and the mirrors 34, 36, and 38 thus permit the construction of a compact instrument. When the instrument is used photographically the lenses 12 and 14 bring to a focus in the plane 22 of a film in the camera the image of a plane (ideally), located in the object space outside the instrument and in front of the lens 12. The distance of this object plane from the instrument is of course dependent upon the constants of the lenses 12 and 14, on their optical separation, and on the separation of the rear lens 14 from the film plane 22.

The film plane 22 is a feature of the instrument and not of the camera, and is fixed by the design of the former. For photographic purposes the instrument must be used with a camera whose film or plate can be made to occupy this plane. The instrument however may be designed to locate the film plane 22 at any desired distance outside the aperture 16 so as to accommodate cameras having any given length of lens barrel. Adaptor rings may be used to space cameras of different focal lengths at the proper distance from the aperture 16 of a given instrument.

In a preferred embodiment of my invention, the lens 14 which forms the photographic secondary lens system is of negative focal length, so as to allow the visual image plane on which the eyepiece is focused to occupy a convenient close-in position while throwing the photographic final image plane up to a location which the film plane of the camera can be made conveniently to occupy. In this way the eyepiece need not protrude excessively to the rear of the instrument and the instrument may have a small overall front-to-rear dimension which facilitates the steady holding thereof.

Light entering the system through the positive lens 12 is reflected through 90 degrees into a path perpendicular to the axis of the lens 12 at the plane mirror 34 which is inclined at an angle of 45 degrees to the axis of the lens 12.

The light reflected at the mirror 34 next suffers at the mirror 36 a second reflection through 90 degrees into a path perpendicular to the path joining the mirrors 34 and 36 and perpendicular also to the axis of the lens 12, the mirror 36 being inclined at 45 degrees to the path joining the mirrors 34 and 36 but being parallel to the axis of the lens 12. After passing through an iris diaphragm 40, the light is reflected through 90 degrees a third time from the mirror 38 into a path parallel but oppositely directed to that leading from the mirror 34 to the mirror 36. The mirror 38 is thus oriented at 90 degrees to the mirror 36 and is also parallel to the axis of the lens 12. The light reflected from the mirror 38 traverses the negative lens 14 and, in the use of the instrument as a telephoto lens, is brought to a focus on the film plane 22 in the camera 18, which is mounted on top of the housing.

The mirrors 36 and 38 are mounted with an iris diaphragm 40 on a focusing assembly or carriage (not shown) which may be racked up and down with reference to the housing 10 along a line parallel to the axis of the lens 14 by means of a screw operable from outside the housing. The length of the optical path joining the lenses 12 and 14 may thus be varied.

In order however to permit accurate focusing of this telephoto combination, to provide a telescopic view finder for use with the telephoto combination, and to provide also an erecting telescope for general visual use, a visual secondary lens system is provided which may be used in place of the photographic secondary lens system to permit visual use of the instrument.

In the embodiment of Fig. 1 the visual secondary lens system includes the negative lens 14, a corrector lens 26 and an eyepiece 24. The negative lens 14 is therefore common to both the visual and photographic lens systems. The eyepiece 24 is adjustably mounted in an aperture 32 in the housing so that its axis intersects the axis of the lens 14 between the lens 14 and the camera aperture. The corrector lens 26 is mounted together with a mirror 28 on a rotating mount 30 which is journaled in the housing between the fixed mounting of the lens 14 and the camera aperture 16.

The mount functions as a switching mechanism, transforming the instrument from visual to photographic use and vice versa. It is provided with detents engaging the housing which give it two positions of angular equilibrium, and it may be shifted from one position to the other by means of controls operable from outside the housing. In one position of angular equilibrium, which may be called the photographic position, the mount 30 permits the rays passing from the front lens 12 through the negative lens 14 to continue unimpeded through the camera aperture 16 and to come to a focus at the film plane 22. In its second or visual position of equilibrium the mount 30 inserts the corrector lens 26 behind the negative lens 14 and inserts a switching mirror 28 into the path between the lens 14 and the camera aperture so as to divert the image-forming rays into the eyepiece 24. The mirror 28 is fixed on the mount with its normal inclined to the aixs of the corrector lens 26 at an angle equal to one-half of the inclination of the axis of eyepiece to the axis of the lens 14. To facilitate the taking of photographs the mount is connected to the housing by spring means (not shown) which tend to shift it from the visual to the photographic position. The mount may be set in the visual position by means of a cocking knob which compresses the spring means, and then is rapidly shifted to the photographic position by pressure on a release trigger (not shown).

The negative lens 14 is designed to produce at the film plane 22 an in-focus image from rays which enter it with the same mean radius of curvature of their associated wave fronts as those rays which will enter it and pass through the corrector lens 26 and the eyepiece 24 to produce an in-focus image in the observer's eye when the mount 30 is in the visual position. Focusing of the instrument is achieved by racking the focusing assembly up and down to provide such a path length between the front lens 12 and the negative lens 14 as will bring rays from the object of interest to the lens 14 with the desired radius of curvature for their associated wave fronts.

To assist in obtaining exactly the optical separation of the lenses 12 and 14 (i. e. exactly the length of the variable path) required to focus sharply on the film plane the image of the objects which are to be photographed, a ground glass screen 46 is provided which may be inserted in the optical axis of the eyepiece at a plane 27 which is fixed with reference to the housing 10 and which fulfills exactly the condition of having the same conjugate plane in the object space as has the film plane 22. The eyepiece is mounted so that its focal plane may be brought into coincidence with the plane 27. Insertion of the ground glass screen transforms into a focusing view finder the telescope which is provided by setting the mount 30 to the visual position. In view finding preparatory to taking a photograph, this ground glass screen may be swung into position in the axis of the eyepiece by means of a control operable from outside the housing. The ground glass screen provides a plane fixed with reference to the housing and requires the observer to focus thereon, thus preventing the accommodation of his eye from using the eyepiece at a wrong set of conjugates and inferring correct focus of the instrument for photographic as well as visual purposes.

A frame line may be provided on the ground glass screen, outlining the field which will be included on the film in the camera.

The eyepiece 24 is preferably a true ocular, designed to magnify the image in space produced by the components 12, 14 and 26 as well as to magnify the real object provided when that image is caught on the ground glass screen 46. It thus provides, upon the removal of the ground glass screen, a telescope of high quality making use of more of the field that is brought to a focus at the plane of the ground glass than would be the case if the eyepiece were a simple magnifier. The eyepiece protrudes from the back of the housing and is provided with an eyeguard 25 which serves to exclude undesired light, to provide the correct eye relief, and to permit bracing of the instrument against the photographer's head.

In use the photographer grasps the instrument by the housing 10 and holds it with the eyeguard 25 against his eye. The folded optical path produced by the mirrors 34, 36, 38 and 28 permits the instrument to have a very short length along the line of sight to the subject to be photographed so that the instrument can be held steadily without the need of a tripod support. In taking a photograph the photographer first adjusts the eyepiece for the accommodation of his eye so as to bring into focus as regards the action of the eyepiece images which appear at the plane of the ground glass screen 46. With his eye relaxed the photographer focuses the eyepiece on the grain of the ground glass. The ground glass screen may next be swung out of the way and the mount 30 is rotated to the telescope position. The subject of the photograph is then chosen, the instrument functioning as a variable focus telescope comprising the primary image-forming lens or objective 12, the lenses 14 and 26 and the eyepiece 24. The subject of interest is brought into preliminary focus by adjustment of the position of the focusing assembly (not shown) which carries the mirrors 36 and 38. If a photograph is to be taken exact focus of the instrument, including the telephoto lens, is achieved by swinging the ground glass screen 46 back into the field of view of the eyepiece. The position of the mirrors 36 and 38 is then adjusted until the image of the subject of interest is in exact focus on the ground glass screen. With the image properly centered in the ground glass screen, the film is exposed by pressing the release trigger which shifts the mount 30 so as to remove the corrector lens 26 and switching mirror 28 from the axis of the negative lens 14. A linkage between the mount 30 and the camera, for example a cable release operated by the release trigger, trips the shutter in the camera after the shift in the position of the mount 30 has been completed.

The user of the instrument need have no interest in photography, however. The camera aperture 16 may be closed by means of a suitable cap and the camera dispensed with. The instrument is then usable as a terrestrial telescope, because the mirrors 34, 36, 38 and 28 invert and revert the image produced by the front lens 12 so that the final image is seen erect.

Fig. 2 shows an alternative method of providing two secondary lens systems and of switching the beam which enters the front or primary image-forming lens to one or another of the secondary lens systems. In the embodiment of Fig. 2 the two secondary lens systems have no common component. The photographic secondary lens system comprises a negative lens 64 fixedly mounted in the housing 60 with its geometrical axis coaxial with a camera aperture 66. The visual secondary image-forming system comprises a lens 76 of low power whose primary function may be the correction of zonal aberration. This lens is also fixedly mounted in the housing, coaxial with the eyepiece 74. A switching mirror 78 movably mounted in the housing is insertable in the light paths at a point intermediate the primary image-forming lens 62 and either of the secondary image-forming systems.

Three mirrors 84, 86 and 88 define an optical path within the housing 60 which is optically coaxial with the primary image-forming lens 62 and which joins the lenses 62 and 64. The length of this path may be varied by motion of a carriage or focusing assembly which supports the mirrors 86 and 88. Mirror 88 is so disposed that the optical axis of the lens 62 after leaving this mirror is coincident with the axis of the lens 64 and camera aperture 66. In this way the lenses 62 and 64 are made optically coaxial. The two form in combination a telephoto lens whose image is produced in a film plane 72 in the associated camera 68.

The switching mechanism which transforms the instrument from photographic to visual use comprises a plane mirror 78 affixed to the rotating mount 80 which permits interposition of this mirror in the optical axis of the lens 62 as deviated by the mirrors 84, 86 and 88. The light path between the lens 62 and the point at which the switching mirror 78 is inserted is therefore common to the combinations of the front lens 62 with each of the secondary lens systems.

When the instrument is used visually the lenses 62 and 76 bring to a focus at a plane 77 fixed in the housing the same image as that which will be focused in the film plane 72 when the mount 80 is in the photographic position, the focusing assembly being unmoved. To this end the lenses 64 and 76 are given such power, in relation to their separation from their respective final image planes 72 and 77 and to their distances from the junction point at which the switching mirror in the visual position intersects the axis of the lens 62 as deviated by the mirrors 84, 86 and 88, that rays traced back from the axial point in the two final image planes will arrive at the junction point with the same radius of curvature for their associated wave fronts. The plane 77 approximates to the focal plane of the eyepiece 74, and the eyepiece may be adjusted to bring its focal plane into coincidence with the plane 77.

Fig. 3 shows a third embodiment of my invention in which again the visual and photographic secondary lens systems have a common component. In this embodiment the photographic secondary image-forming system comprises two lens components 124 and 136 and the visual secondary image-forming system comprises the single component 136. These components are spaced apart sufficiently to permit a switching mirror 138 to be inserted between them but may be so dimensioned as to act together as an equivalent thick lens of negative focal length when the switching mirror is not interposed to adapt the instrument to visual use. They form in conjunction with the primary image-forming lens 122 a telephoto objective producing an image in the film plane 132. Mirrors 144, 146 and 148 provide an optical path of variable length common to the visual and photographic uses of the instrument, and the switching mirror 138 transforms the instrument from photographic to visual use and vice versa. The mirror 138 is mounted on a rotating mount 140 similar to that of Fig. 2 so as to be inserted in or removed from the common optical axis of the lens components 124 and 136. Or it may be mounted on a sliding carriage moving on ways fastened in the housing and serving to shift the mirror in its own plane into an out of operative position.

The lens components 124 and 136 are so computed, singly and in combination, by reference to their distances from their respective final image planes (which are the film plane 132 in the camera and a plane 137 fixed in the housing at or near the focal plane of the eyepiece 134) and their separation from the junction point where the switching mirror 138 is inserted in the axis of these components, that components 124 and 136 acting together will bring to a focus in the film plane 132 the same rays which will be brought to a focus in the eyepiece focal plane 137 by the component 124 alone, when the mirror 138 is inserted between these components.

The power required of the components of the visual secondary lens system which precede the eyepiece depends of course upon the design of the instrument. The usual terrestrial telescope includes as image-forming elements (except for erecting components) only an objective and an ocular. The objective brings a real image of the object under observation to a focus at, usually, the focal plane of the eyepiece, and this real image is then magnified by the ocular and presented to the eye. My invention contemplates likewise that the visual secondary lens components preceding the eyepiece may be of zero power, or indeed that they may be absent. The alternate conjugate relationship between the eyepiece focal plane and the film plane is then still preserved, the photographic secondary system producing at a different distance from the junction point an in-focus image of different (and larger) size than that which is produced at the focal plane of the eyepiece. In such a case the radius of curvature required to be produced in the waves at the junction point by the primary image-forming lens at the front of the instrument is equal to the separation of the junction point from the axial point of the eyepiece focal plane.

As previously stated, the particular arrangements of elements shown in the drawings and described herein are exemplary and not exhaustive of my invention. All variations and modifications which fall within the scope of my invention are intended to be included in the following claims.

I claim:

1. In combination a telephoto lens and telescope comprising a housing, a positive refracting component fixedly mounted in the housing, a negative refracting component fixedly mounted in the housing, a camera aperture in the housing coaxial with the negative refracting component and adapted to support a photographic camera, an eyepiece aperture in the housing, an eyepiece adjustably mounted in the eyepiece aperture with its axis intersecting the axis of the camera aperture, three mirrors mounted in the housing and adapted to render the positive and negative refracting components optically coaxial, means adapted to move two of the said mirrors in unison so as to vary the length of the path joining the said positive and negative components, and a corrector lens and a fourth mirror mounted together on a rotating mount journaled in the housing between the negative component and the camera aperture, the said mount being adapted to insert the corrector lens behind the negative component in coaxial relation therewith and to insert the fourth mirror into the axis of the negative component so as to deviate rays passing through the negative component and corrector lens into the eyepiece.

2. An image-forming optical system adapted to visual and to photographic use comprising a housing, a positive lens in said housing, a camera aperture in said housing adapted to accommodate a photographic camera, an eyepiece aperture in said housing adapted to accommodate an eyepiece, an eyepiece mounted in said aperture, a negative lens fixedly mounted in said housing in optically coaxial relation with said camera aperture, a plurality of specularly reflecting means adapted to render said front lens, negative lens and camera aperture optically coaxial, at least two of the said reflecting means being movably mounted in said housing so as to permit variation in the length of the optical path between said front lens and negative lens, a rotating mount journaled in said housing intermediate said negative lens and camera aperture, and a lens of low power and a further specular reflector mounted on said mount, said further reflector being mounted at an angle to the geometric axis of said lens of low power equal to one-half the angle between the geometric axis of said negative lens and the geometric axis of said eyepiece, said mounting having one position of equilibrium in which said lens of low power is coaxial with said negative lens and a second position of equilibrium in which light may pass unimpeded from said negative lens into said camera aperture, said negative lens and lens of low power being so computed that objects in focus at a plane fixed with reference to said camera aperture by the action of said front lens and negative lens when said mount is in the second of said positions, will be in focus at the focal plane of said eyepiece by the action of said front lens, negative lens and lens of low power, when the said mount is in the first of the said positions.

3. A combined telephoto objective and erecting telescope comprising a housing, a front positive lens fixedly mounted in the housing, a camera mounting arranged on the housing with its axis perpendicular to the geometrical axis of the front positive lens, a telescope eyepiece arranged on the housing with its axis parallel to but laterally displaced from the geometrical axis of the front positive lens, a first mirror fixed in the housing in position to deviate the optical axis of the front positive lens into parallelism with the axis of the camera housing, a second and a third mirror each adapted successively to deviate the optical axis of the front positive lens through 90 degrees, said optical axis as deviated by each of the second and third mirrors remaining perpendicular to the geometric axis of the front positive lens, the third mirror being so positioned that the optical axis of the front positive lens as deviated thereby coincides with the axis of the camera mounting, a first carriage supporting said second and third mirrors for joint motion in a direction parallel to the axis of the camera mounting, a negative lens fixedly mounted in the housing with its geometric axis coinciding with the axis of the camera mounting, a second carriage pivotally mounted in the housing intermediate the negative lens and camera mounting, a fourth mirror and a supplementary lens arranged on the second carriage for removable insertion into the geometric axis of the negative lens, said fourth mirror when so inserted deviating into the eyepiece rays passing through the front positive lens, negative lens and supplementary lens, said supplementary lens having such power as to bring to focus at the focal plane of the eyepiece rays which are brought by the front positive lens and negative lens to focus at a plane fixed with reference to the camera mounting when the fourth mirror and supplementary lens are not so inserted.

4. A combined telephoto objective and erecting telescope comprising a housing, a front positive lens fixedly mounted in the housing and serving as a component both of the objective of the telescope and of the telephoto objective, a camera mounting arranged on the housing with its axis perpendicular to the geometrical axis of the front positive lens, a telescope eyepiece arranged on the housing with its axis parallel to but laterally displaced from the geometrical axis of the front positive lens, a first mirror fixed in the housing in position to deviate the optical axis of the front positive lens into parallelism with the axis of the camera mounting, a second and a third mirror each adapted successively to deviate the optical axis of the front positive lens through 90 degrees, said optical axis as deviated by each of the second and third mirrors remaining perpendicular to the geometric axis of the front positive lens, the third mirror being so positioned that the optical axis of the front positive lens as deviated thereby coincides with the axis of the camera mounting, a first carriage supporting said second and third mirrors for joint motion in a direction parallel to the axis of the camera mounting, a second carriage, a fourth mirror mounted on said second carriage for removable insertion into the optical axis of the front positive lens as deviated by said first three mirrors in position to deflect the optical axis of the front positive lens so deviated into coincidence with the axis of the eyepiece, said second and third mirrors reverting the image formed by the front positive lens and said first and fourth mirrors inverting the image formed by the front positive lens, a negative lens fixedly mounted in the housing coaxially with the camera mounting and adapted to cooperate with the front positive lens in the formation of a telephoto objective, and a second positive lens adapted to cooperate with the front positive lens in the formation of a telescope objective, said negative lens, second positive lens and fourth mirror being so arranged that at least one of said negative and second positive lenses is coaxial with said front positive lens for only one position of said fourth mirror.

5. A combined telephoto objective and erecting telescope according to claim 4 in which said second positive lens is fixedly mounted in the housing coaxially with said eyepiece.

6. A combined telephoto objective and erecting telescope according to claim 4 in which said second positive lens is fixedly mounted in the housing coaxially with said camera mounting between said negative lens and third mirror.

7. A combined telephoto objective and erecting telescope comprising a housing, a front positive lens fixedly mounted in the housing and serving as a component both of the objective of the telescope and of the telephoto objective, a camera mounting arranged on the housing with its axis perpendicular to the geometrical axis of the front positive lens, a telescope eyepiece arranged on the housing with its axis parallel to but laterally displaced from the geometrical axis of the front positive lens, a first mirror fixed in the housing in position to deviate the optical axis of the front positive lens into parallelism with the axis of the camera mounting, a second and a third mirror each adapted successively to deviate the optical axis of the front positive lens through 90 degrees, said optical axis as deviated by each of the second and third mirrors remaining perpendicular to the geometric axis of the front positive lens, the third mirror being so positioned that the optical axis of the front positive lens as deviated thereby coincides with the axis of the camera mounting, a first carriage supporting said second and third mirrors for joint motion in a direction parallel to the axis of the camera mounting, a second carriage, a fourth mirror mounted on said second carriage for removable insertion into the optical axis of the front positive lens as deviated by said first three mirrors in position to deflect the optical axis of the front positive lens so deviated into coincidence with the axis of the eyepiece, a negative lens fixedly mounted in the housing coaxially with the camera mounting and adapted to cooperate with the front positive lens in the formation of a telephoto objective, and a second positive lens adapted to cooperate with the front positive lens in the formation of a telescope objective, said second positive lens and fourth mirror being so disposed that said second positive lens is rendered simultaneously coaxial with the eyepiece and front positive lens only upon insertion of said fourth mirror into the optical axis of the front positive lens as deviated by said first three mirrors.

8. A combined telephoto objective and erecting telescope according to claim 7 in which said second positive lens is fixedly mounted in the housing coaxially with said eyepiece.

9. A combined telephoto objective and erecting telescope according to claim 7 in which said second positive lens is fixedly mounted in the housing coaxially with said camera mounting between said negative lens and third mirror.

LEONARD F. BARCUS.

REFERENCES CITED

The following references are of record in the file of this patent:

UNITED STATES PATENTS

| Number | Name | Date |
|---|---|---|
| 1,724,566 | Davidson | Aug. 13, 1929 |
| 1,958,280 | Patterson et al. | May 8, 1934 |
| 2,100,967 | Levy | Nov. 30, 1937 |
| 2,182,097 | Schenk | Dec. 5, 1939 |
| 2,219,314 | Hoch | Oct. 29, 1940 |
| 2,364,652 | Pollock | Dec. 12, 1944 |

FOREIGN PATENTS

| Number | Country | Date |
|---|---|---|
| 291,252 | Italy | Dec. 11, 1931 |
| 755,987 | France | Sept. 18, 1933 |
| 760,954 | France | Dec. 27, 1933 |
| 586,031 | Germany | Feb. 9, 1934 |
| 489,125 | Great Britain | July 20, 1938 |